United States Patent [19]

Townsend

[11] 4,127,921
[45] Dec. 5, 1978

[54] HOSE CLIPS

[75] Inventor: David J. Townsend, Fairbourne, Wales

[73] Assignee: Innovation and Technical Development Co., Leeds, England

[21] Appl. No.: 793,240

[22] Filed: May 3, 1977

Related U.S. Application Data

[63] Continuation of Ser. No. 614,170, Sep. 16, 1975, abandoned.

[30] Foreign Application Priority Data

Sep. 16, 1974 [GB] United Kingdom ............... 40242/74

[51] Int. Cl.² ............................................. B65D 63/10
[52] U.S. Cl. .......................................... 24/27; 24/256
[58] Field of Search ................. 24/27, 30.5 T, 20 TT, 24/20 S, 256, 261 AC, 276, 283; 285/244, 318

[56] References Cited

U.S. PATENT DOCUMENTS

| 197,716 | 12/1877 | Caldwell | 24/27 |
|---|---|---|---|
| 402,673 | 5/1889 | Hudson | 24/27 |
| 445,828 | 2/1891 | Baer | 24/27 |
| 911,583 | 2/1909 | Focht | 24/256 |
| 1,529,979 | 3/1925 | Williams | 24/283 |
| 2,147,963 | 2/1939 | Casciotti | 24/256 |
| 2,472,172 | 6/1949 | Ovens et al. | 24/27 |
| 2,957,217 | 10/1960 | Mortorelli | 24/27 |

FOREIGN PATENT DOCUMENTS

| 1177161 | 12/1958 | France | 24/256 |
|---|---|---|---|
| 8611 of | 1910 | United Kingdom | 24/256 |
| 10042 of | 1913 | United Kingdom | 24/256 |
| 482779 | 4/1938 | United Kingdom | 285/318 |

Primary Examiner—Henry S. Jaudon
Attorney, Agent, or Firm—Cesari and McKenna

[57] ABSTRACT

For clamping a hose or flexible pipe on an insert of corresponding cross-sectional shape, there is disclosed a hose clip which is of generally coil spring configuration and which has two mutually engageable hooked end portions each projecting generally outwardly of the coil, the hose clip having, in its relaxed condition, a non-integral number of turns of a characteristic diameter and being constructed such that, on elastically deforming the hose clip (without plastically deforming it) to bring the hooks of the hooked end portions thereof into mutual engagement, the hose clip assumes its clamping position and the configuration of a coil spring having an integral number of turns the diameter of which is smaller than the said characteristic diameter. Preferably, the hose clip is formed of spring steel wire and comprises one complete and one incomplete turn of the wire when the hose clip is in its relaxed condition.

The invention further provides a method of connecting a hose or flexible pipe to an insert using a hose clip according to the invention. There are also disclosed embodiments of tool which may conveniently be used in the method of the invention.

11 Claims, 14 Drawing Figures

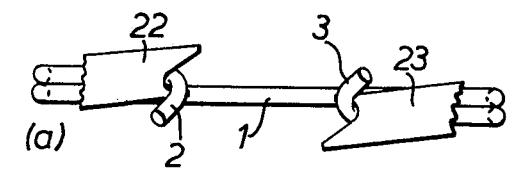
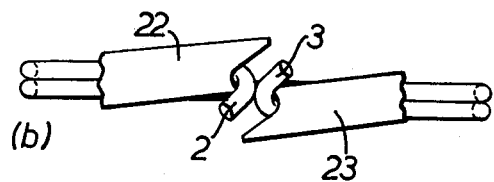
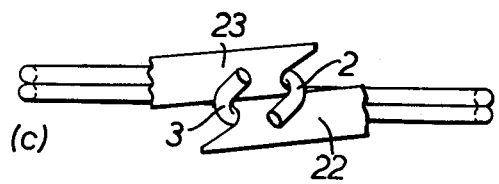
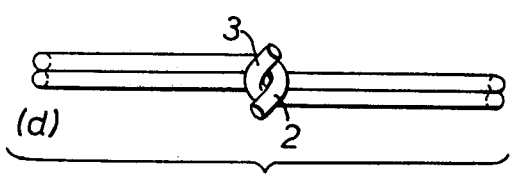
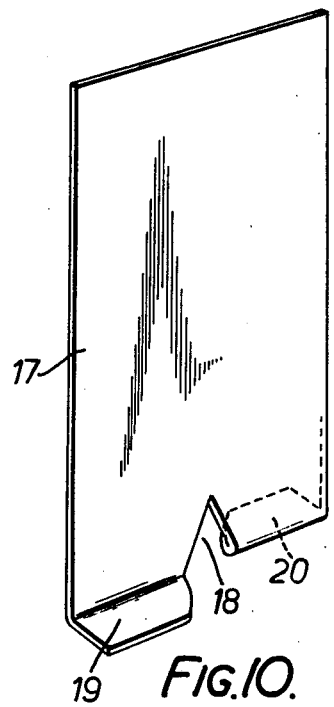
FIG.9.
FIG.10.
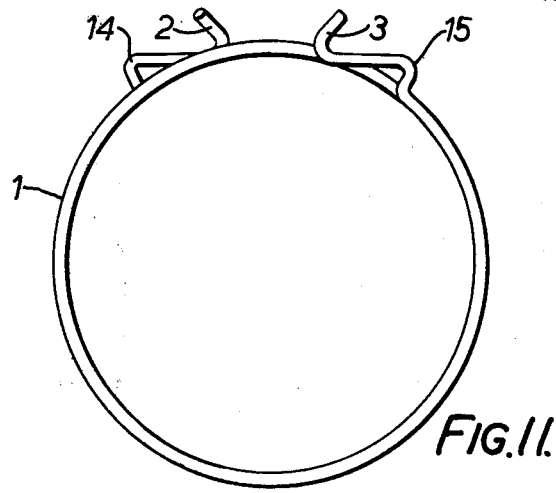
FIG.11.

HOSE CLIPS

This is a continuation of application Ser. No. 614,170, filed Sept. 16, 1975, now abandoned.

BACKGROUND OF THE INVENTION

This invention relates to hose clips (also known as hose clamps) which are used inter alia for securing, or clamping, a hose or flexible pipe on an insert of corresponding cross-sectional shape, such as a further hose or pipe.

It is frequently necessary to secure, or clamp, a flexible pipe or hose to an insert of corresponding cross-sectional shape such as a rigid pipe. If the flexible pipe or hose in use contains a fluid under pressure or is vibrating so as to generate shear stresses at its connection with the insert then it may be necessary to "strangle" the flexible pipe or hose onto the insert to prevent leakage of fluid between the flexible pipe or hose and the insert or to prevent relative movement of the flexible pipe or hose and the insert. (By "to strangle" there is meant to compress radially so as to increase the frictional forces acting between the interior wall of the hose or flexible pipe and the exterior wall of the insert.)

Various forms of hose clip have been proposed heretofore; see, for example British Pat. Specifications Nos. 420,244, 459,499, 461,048, 813,521, 1,064,048 and 1,261,782.

SUMMARY OF THE INVENTION

According to a first aspect of the present invention there is provided a hose clip which is of generally coil spring configuration and which has two mutually engageable hooked end portions each projecting generally outwardly of the coil, the hose clip having, in its relaxed condition, a non-integral number of turns of a characteristic diameter and being constructed such that, on elastically deforming the hose clip (without plastically deforming it) to bring the hooks of the hooked end portions thereof into mutual engagement, the hose clip assumes its clamping position and the configuration of a coil spring having an integral number of turns the diameter of which is smaller than the said characteristic diameter.

According to a second aspect of the invention there is provided a connection between a flexible pipe or hose and an insert of corresponding cross-sectional shape, in which connection a portion of said flexible pipe or hose is disposed around said insert, and a hose clip in accordance with the first aspect of the invention encircles said portion of said flexible pipe or hose with the hooks of the hooked end portions of the hose clip in mutual engagement thereby to clamp said flexible pipe or hose on said insert.

The invention also provides a method of connecting a flexible pipe or hose and an insert of corresponding cross-sectional shape, which method comprises the steps of a) introducing the insert into a portion of said flexible pipe or hose whereby said portion overlaps said insert, b) disposing a hose clip according to the first aspect of the invention around said portion of said flexible pipe or hose in a relaxed condition; and c) bringing the hooks of the hooked end portions of the hose clip into mutual engagement so that the hose clip clamps the flexible pipe or hose on the insert.

While it was envisaged that hose clips in accordance with the first aspect of the invention may have a coil spring configuration in which, in the relaxed condition, there is an incomplete turn only, or two or more complete turns and an incomplete turn, the preferred configuration (which has been found to have most widespread application) is one in which there is one complete and one incomplete turn. Further description of preferred embodiments of hose clips according to the present invention set out below will be confined to hose clips having in their relaxed condition one complete turn and one incomplete turn.

DESCRIPTION OF THE PREFERRED EMBODIMENTS

The hose clip is made from a material which exhibits a high elastic limit i.e. a material which can withstand large applied stresses without undergoing plastic deformation. The material should also be capable of undergoing considerable elastic deformation. Preferably, the hose clip is formed of spring steel wire, for example steel wire which conforms to a specification in accordance with British Standard No.BS1408 or British Standard No.BS2803, with British Standard Specification No.BS1408B having most wide-spread application. For special applications, a silicon chromium material conforming to British Standard Specification No.BS970 (EN 48A), a chromium vanadium material conforming to British Standard Specification No.BS1429 (EN47 and EN50) and stainless steels conforming to British Standard No.BS2056 may be useful. Materials conforming to British Standards Nos.BS 5970 and BS1429 would be useful for high temperature applications.

The wire of which the hose clip is preferably formed would normally be of circular cross-section. However, square and other non-circular cross-sectional shapes may find application.

The two hooked end portions of the hose clip may conveniently be brought into mutual engagement by a tool having two surfaces which engage the hooked end portions, which tool can be rotated or squeezed so as to carry the two hooked end portions past one another so as to overlap and allow the hooks to engage one another.

BRIEF DESCRIPTION OF THE DRAWINGS

FIGS. 9a, 9b, 9c, and 9d show views similar to FIG. 6 of the manner in which a tool having two opposed jaws operates to bring the hooked end portions into nutual engagement;

FIG. 10 is a perspective view of one embodiment of a releasing tool;

FIG. 11 shows a view of a hose clip along the y axis of FIG. 1;

FIGS. 14a, 14b and 14 show an alternative embodiment in which the end portions are rolled back to avoid sharp tips.

Preferred embodiments of hose clips according to the first aspect of the invention will now be described generally with reference to FIGS. 1 to 5 of the accompanying drawings.

Figure 1:
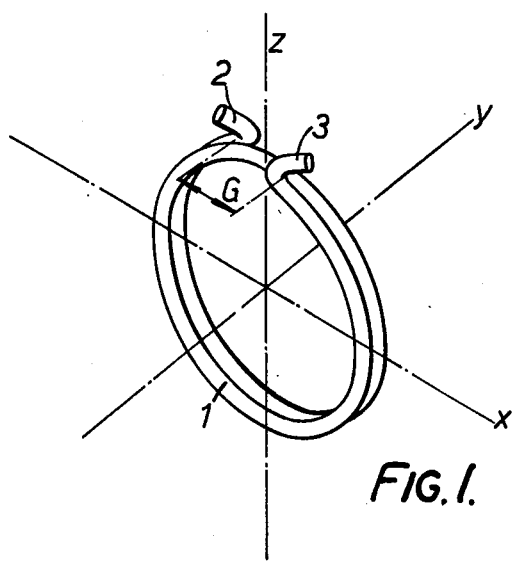
FIG. 1 shows a perspective view of a hose clip referred to three mutually perpendicular axes.

FIG. 1 shows a hose clip of generally coil spring configuration comprising one incomplete turn and one complete turn of spring steel wire 1, the hose clip being in a relaxed condition. The end portions of the wire are formed into hooks 2 and 3 which project outwardly of the coil of the clip. Superimposed upon the hose clip of FIG. 1 are axes x, y and z disposed relative to the hose clip such that
(i) the origin of the axes lies on the longitudinal axis of the coil;
(ii) the plane yz passes through the mid-point of a gap G between the two hooks 2 and 3 of the hose clip and includes the longitudinal axis of the coil; and
(iii) plane xz lies normal to the longitudinal axis of the coil of wire forming the hose clip, and intersects plane xy along a line passing between the two turns of the coil which cut the plane xy.

With the hose clip in a relaxed condition as shown in FIG. 1, there is a gap G between the two hooked end portions of the coil of the hose clip. The size of the gap G is defined as the distance between the inside curved surfaces of the hooks, projected into the plane xz and measured in a direction parallel to the xy plane.

Figure 2:
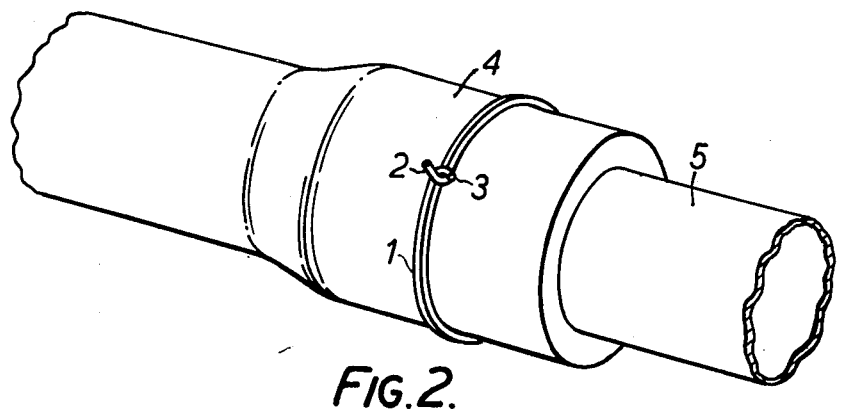
FIG. 2 shows a perspective view of the hose clip disposed around a hose.

Whilst the hose clip is shown in FIG. 1 in a relaxed condition, in FIGS. 2, 3, 4 and 5 it is shown in a clamping position, in which the two hooks 2 and 3 are mutually engaged so that the wire of the hose clip is self-stressed. In such a clamping position, the hose clip comprises two complete turns of the wire and the diameter of the coil is correspondingly smaller than that characteristic of the coil in its relaxed condition. FIG. 2 shows the hose clip, in the clamping position, strangling a hose 4 of a resilient material onto an insert formed as a metal pipe 5.

Figure 3:
FIG. 3 shows a part of the hose clip viewed along the y axis of FIG. 1.
Figure 5:
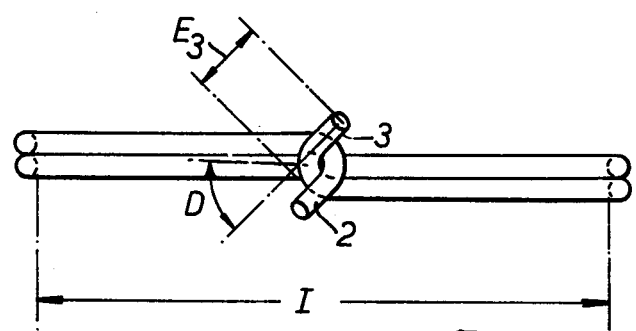
FIG. 5 shows the hose clip, viewed along the z axis of FIG. 1.
Figure 4:
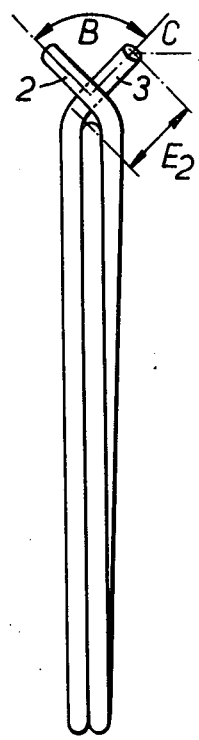
FIG. 4 shows the hose clip, viewed along the x axis of FIG. 1.

FIGS. 3, 4 and 5 show more clearly the form of the hose clip shown in FIGS. 1 and 2. FIG. 3 is drawn in the plane xz and in it a part of the hose clip, including the two similar hooks, 2, 3 is shown viewed parallel to axis y. Now, discussing the dimensions of the hooks 2 and 3 with reference to one only of the two hooks, the hook 3 has a projected length in the plane xz of $E_1$. The hook 3 has a straight portion contiguous with the end of the wire and the longitudinal axis of the straight portion makes an angle A with the xy plane. The angle A is therefore a measure of the angle at which the hook 3 projects from the coil. It will be appreciated that, in order that the angle A may be independent of the size of the gap G, it should be measured when the hose clip is in its clamping position.

In the embodiment shown in FIGS. 1 to 5, the hook 2 also has a straight portion whose axis projects from the coil and so the hook 2 can therefore be described in similar terms to those used to describe hook 3. However, in other embodiments of hose clip, the length and orientation of hook 2 may differ from that of the hook 3.

The wire 1 of which the hose clip is formed has a diameter W, as shown in FIG. 3.

FIG. 4 shows the hose clip as viewed in a direction parallel to axis x, i.e. projected into the yz plane. Projected into this plane, the hook 3 makes an angle C with a line parallel to the xy plane and has a length $E_2$. As discussed above with reference to angle A in FIG. 3, the projected length $E_2$ and orientation C change with the size of gap G. The quantities are, therefore, measured with the hose clip in a clamping position. FIG. 4 also shows angle B, the angle between the longitudinal axes of hooks 2 and 3 when projected into plane yz. This angle B also changes with the size of gap G and so should be measured with the hose in a clamping position.

FIG. 5 is a view taken parallel to axis z, i.e. the hose clip is projected into the xy plane. In this plane, the hook 3 has a projected length $E_3$ and makes an angle D with the xz plane. As with the view of FIG. 3, changes in the size of the gap G affect the magnitude of D so that when comparing these angles, their values when the hose clip is in the clamping position should be compared. If the size of gap G is increased, then with the hose clip in the relaxed position, angle A decreases while angle D increases.

In FIG. 5 and elsewhere in this specification, the internal diameter of the coil of the hose clip is represented by the reference letter I.

The ranges of dimensions of preferred embodiments of hose clips according to the invention as described above can be defined in terms of the aforementioned parameters $E_1$, $E_2$ and $E_3$; A, B, C and D; I and W; and T, the true length of a hook and R, the true minimum radius of curvature of the inside surface of a hook. The dimensions of the preferred embodiments will now be discussed under a number of headings, as follows:

Hose Clip Diameter, I

It has been found that hose clips having inside diameters I in the range of from 5 to 200 mm and of the general form shown in FIGS. 1 to 5 function satisfactorily. Outside this range of inside diameters, successful functioning of the hose clips depends on the development and availability of specially constructed tools for bringing the hooked end portions into mutual engagement. Generally, it will be appropriate to select a hose clip having an inside diameter which is such that the hose clip is a sliding, or slightly oversize, fit on the flexible hose or pipe with the hose clip in its relaxed condition.

Wire diameter, W

Wire diameter W is chosen having regard to the tensile stress likely to be present in the wire when the hose clip is in use. Such tensile stress will generally increase with hose clip diameter I, with the hydrostatic pressure within the hose around which the hose clip is fitted, and with increasing hardness of the material of which the hose or flexible pipe is formed.

Size of Gap, G

This parameter governs ΔI, the magnitude of the change of internal diameter I of the hose clip when it is moved from its relaxed condition to its clamping position. For a given ΔI, the size of the gap G must be increased with increasing hose clip diameter. Large ΔIs may be necessary when the hose or flexible pipe around which the hose clip is to be fitted is of soft, easily deformed material (and vice versa), or when large variations in hose wall thickness and insert diameter are encountered.

Length of Hooks, T

The hooks must both be sufficiently long to ensure that the hose clip can attain its clamping position and remain so disposed. The hooks must not be so long that they interfere with each other during the clamping operation to the extent that they cannot be mutually engaged. The true hook length T should generally lie in the range $2W \leq T \leq 5W$. In general, a true length of between 3W and 4W for each hook of a hose clip has been found to be preferable.

Orientation of Hooks

When the clips are disposed in the clamping position the angles A, B, C and D as shown on FIGS. 3, 4 and 5 should lie within the ranges $0° \leq A \leq 90°$, $50° \leq B \leq 130°$, $10° \leq C \leq 80°$ and $0° \leq D \leq 90°$.

Preferably, the orientations of the hooks should be

|   | Preferably ° | Most preferably ° |
|---|---|---|
| A | 15-75 | 45 |
| B | 70-110 | 90 |
| C | 30-60 | 45 |
| D | 15-75 | 45 |

Radius of Curvature of Hooks, R

The true radius of curvature, R, of the inside of the hooks is preferably in the range of from 0.5 W to 1.5 W, most preferably 0.75 W.

The hose clips described above with reference to FIGS. 1 to 5 of the accompanying drawings all have a coil spring configuration in which the coil is wound clockwise, i.e. the coil is wound such that, to an observer situated on the longitudinal axis of the coil but remote from the coil, a point moved clockwise around the turns of the coil appears to recede from the observer.

Hose clips of such a clockwise configuration are moved to a clamping position by moving the hooked end portions thereof along paths having a generally clockwise component. It will be appreciated that hose clips which have the configuration of a coil spring wound anti-clockwise form part of the present invention and that they are moved to a clamping position by movement of the hooked end portions thereof along paths having a generally anti-clockwise component.

It is convenient to provide hose clips according to the invention with two hooks of similar dimensions. However, it may be desirable to provide hose clips having two dissimilar hooks, for example a first hook may lie in the xz plane with $E_1 = T$ while the second hook would have associated therewith a small C and relatively large $E_2$. (Such an arrangement might be appropriate if the first hook is to be used for another purpose, for which an orientation parallel to the xz axis is appropriate).

Preferred embodiments of tools for bringing the two hooked end portions of hose clips according to the first aspect of the invention into mutual engagement will now be described with reference to FIGS. 6, 7 and 8 of the accompanying drawings.

Figure 6:
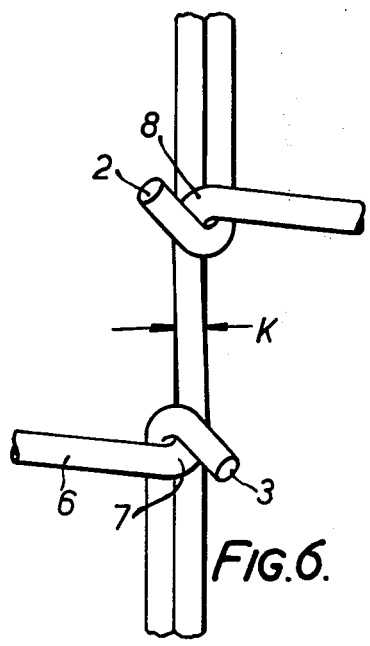
FIG. 6 is a plan view of part of a tool and part of a hose clip viewed along the z axis of FIG. 1 showing schematically the manner in which the tool operates to bring the hooked end portions of the hose clip into mutual engagement.

In FIG. 6, the two hooked end portions 2 and 3 of a hose clip are brought into mutual engagement by a tool 6 comprising an "S"-shaped portion which includes two curved sections 7 and 8 radiused to permit them each to accommodate one of the two hooked end portions 2 and 3 of the hose clip.

Rotation of the tool in a clockwise direction results in an over-centre action which carries the hooked end portions 2 and 3 of the hose clip into its clamping position. Preferably, the dimension K shown on FIG. 6 is approximately equal to the sum of the "interior" lengths of the hooks so that the tool can smoothly carry one hooked end portion past the other during rotation of the tool. By "interior" length is meant the total length of the hook in the plane xy ($E_3$) minus the diameter of the wire forming the hook. The dimension K should not be greatly in excess of, or less than, the sum of the interior lengths of the two hooks although tools with a small dimension K can work in certain applications.

Figure 7:
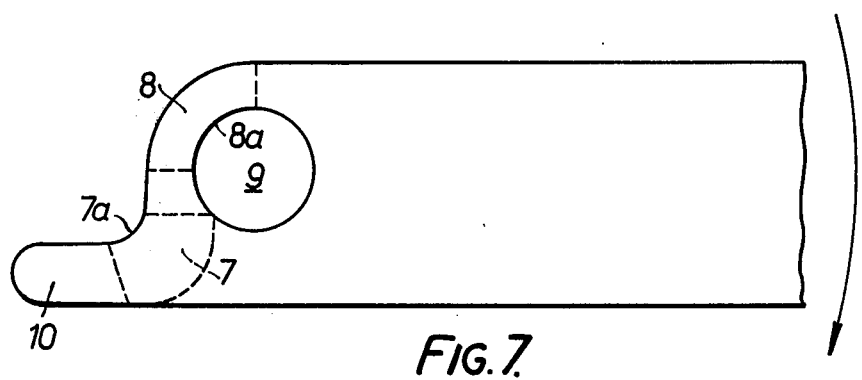
FIG. 7 is a plan view of a first embodiment of a tool.

FIG. 7 shows a first embodiment of tool which operates in the manner described above with reference to FIG. 6. The tool comprises a strip of mild steel or other suitable material having a circular aperture 9 drilled therein adjacent a first end 10 of the tool. The first end 10 of the tool comprises curved portions 7 and 8 of opposite rotational senses, having inside surfaces 7a and 8a respectively.

In use, the tool is applied to the two hooked end portions of a hose clip according to the invention so that the inside surfaces 7a and 8a each engage one of the hooked end portions. The tool shown in plan view in FIG. 7 is suitable for moving the hooked end portions of a clockwise-wound hose clip into engagement if the bulk of the hose clip including its coil is disposed beneath the tool as the latter is shown in FIG. 7. The hooked end portions are moved into a position of mutual engagement by clockwise rotation of the tool. Alternatively, hose clips of an anti-clockwise-wound coil configuration can be moved to a clamping position by disposing them above the tool and rotating the tool clockwise as shown on the Figure.

Figure 8:
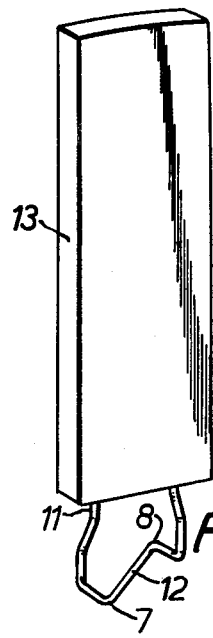
FIG. 8 is a perspective view of a second embodiment of a tool.

FIG. 8 shows a second embodiment of tool. The tool shown in FIG. 8 comprises a resilient wire 11 of sufficient strength to elastically deform the hose clip without itself suffering deformation. The wire 11 has a straight portion 12 bounded at each end by an acute bend 7 and 8 in the wire. The two bends 7 and 8 are co-planar but of opposite sense so that the tool has an overall "S" shape. The wire 11 of the tool is extended from both of the bends in a direction normal to the plane of the "S"-shaped portion of the tool to locate within a handle 13 by which the tool may be manipulated. Alternatively, the wire 11 may be inserted into a machine tool for mechanical operation thereof.

FIG. 9a shows a portion of a hose clip 1 including two hooked end portions 2 and 3. Each of the two hooks of the hooked end portions 2 and 3 is engaged by a jaw 22 and 23 respectively of the tool. FIGS. 9b and 9c show progressive stages of movement when the tool is manipulated to move the jaws 22 and 23 towards one another. In FIG. 9c the hooks are overlapping, having been pushed past one another by the jaws. The hooked end portions engage one another once they have overlapped, and the tool may thereafter be removed from the hose clip, leaving the latter in its clamping position as shown in FIG. 9d.

It is difficult to clamp a clip on an oversize hose using one of the above-described tools and so there is less danger than with some previously known hose clips of applying too much tension to the clamped hose.

The release of the clip by reversing the clamping procedure can be achieved easily with a pair of domestic pliers or a screw-driver, or any straight-edged tool, by insertion thereof between the hooks and appropriate rotation. However, to facilitate the release of the hose clip from its clamping position, a special releasing tool has been designed. FIG. 10 of the accompanying drawings is a perspective view of one embodiment of such a releasing tool. This tool shown in FIG. 10 consists of a strip 17 of metal 1–2 inches long and ½ inch wide. The thickness of the strip of metal is relatively small, but is great enough to resist the twisting action imposed on it during the releasing operation. The metal strip 17 has, at its end, a triangular slot 18. The width of the slot is sufficient to allow entry of the two interengaged hooked end portions of the hose clip. The depth of the slot is sufficient to allow the metal of the tool to be bent perpendicular to the plane of the metal strip so as to form two feet 19 and 20. Each foot 19 and 20 is adapted to engage under a hooked end portion of the hose clip so that a twist of the tool in a rotational sense opposite to that used to move the hooked end portions into a clamping position thereby releases the hooked end portions of the hose clip and releases the hose clip. The metal strip may be embedded in a suitable handle and this handle may be the same as that of the applying tool.

If the flexible pipe or hose encircled by the hose clip in use is constructed of a material which readily suffers instantaneous or time-dependent plastic deformation, for example creep, when subjected to a compressive stress such as that applied to it by a clip clamped around it, it may be advantageous to place a collar between the hose clip and the flexible pipe or hose prior to strangling the hose clip thereon. The collar should be of a form which allows it to deform and to reduce its radius when the hose clip is moved into its clamping position but which distributes the resultant compressive stress over a large area of the flexible pipe or hose. Thus, the collar may be formed of metal strip formed into a substantially circular shape but with spaced ends so that its radius may be reduced in compression. The collar may be provided separately from the coil of the hose clip or may be fastened to the coil.

In these applications an alternative solution would be to provide the hose clip as an elongate strip of a resilient material, to the ends of which are secured hooked end portions as hereinbefore described. The large surface area of the strip forming the coil of the hose clip in contact with the hose would distribute the stress in much the same way as would a collar.

If the hose clip of the invention is to be used in circumstances in which it is necessary that its radius when clamped be allowed to vary over a small range, for example where it is used to clamp hoses onto pipes of a range of radii, it is advantageous to provide in the coil of the hose clip further portions, in addition to the two hooked end portions, which are bent out of a strictly circular arc. These further bent portions may deform during clamping of the hose clip to partially relieve tensile stresses set up in the turns of wire and thus to allow the radius of the hose clip to vary over a small range. One convenient form of such a bent portion of the coil of the hose clip is a circular loop of wire co-planar with the turns of the hose clip but disposed outside the circumference of the turns of the hose clip.

Figure 12:
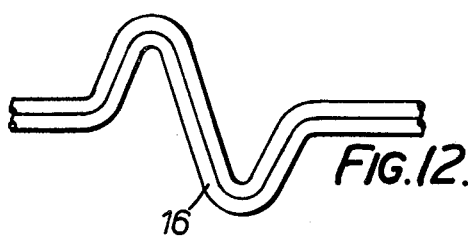
FIG. 12 shows a plan view of a portion of the circumference of the coil of a hose clip.

Other convenient ways of providing further bent portions in the hose clip are shown in FIGS. 11 and 12 of the accompanying drawings, in which:

FIG. 11 shows a view of a hose clip along the y axis; and

FIG. 12 shows a plan view of a portion of the circumference of the coil of a hose clip.

FIG. 11 shows a hose clip 1 in a relaxed condition and having one incomplete turn and at least one complete turn. The hose clip has hooked end portions 2 and 3 and bent portions 14 and 15 adjacent the hooked end portions 2 and 3 respectively. On moving the hooked end portions 2 and 3 into mutual engagement, the bent portions 14 and 15 will deform elastically under the action of large tensile stresses within the wire forming the coil of the hose clip.

FIG. 12 shows a portion 16 of the coil of a hose clip having in its clamping position, two complete turns of wire. The portion 16 is deformed to a "Z" shape in directions parallel to the longitudinal axis of the coil. With the hose clip in a clamping position, the portion 16 of the coil can deform to relieve tensile stresses in the wire of the hose clip. Preferably the "Z"-shaped portion is situated on the coil diametrically opposite the hooked end portions thereof.

Figure 13:
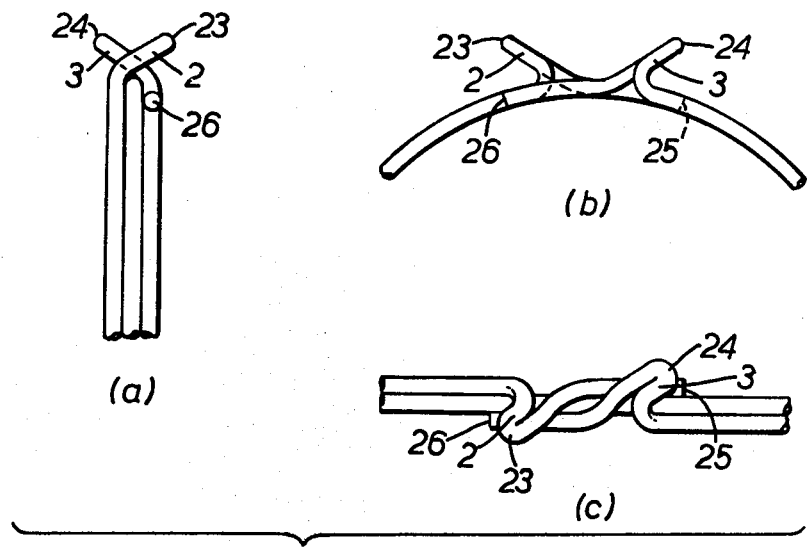
FIGS. 13a, 13b and 13c show an alternative embodiment in which end portions are rolled back to avoid sharp tips.
Figure 14:
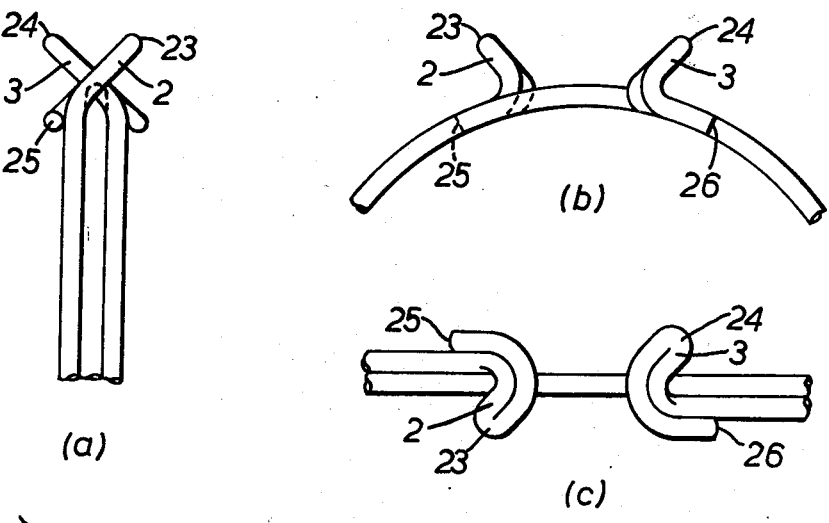

In many applications of hose clips according to the present invention, it may be desirable to eliminate sharp ends to the hooked end portions of the hose clips. The wire forming the end portions can be rolled back on itself so as to avoid sharp tips to the hooked end portions. Two ways of forming such end portions are shown in FIGS. 13a, 13b and 13c and 14a, 14b and 14c of the accompanying drawings. Each of FIGS. 13 and 14 show views in three mutually perpendicular directions (corresponding to the axes x, y and z respectively of FIG. 1) of a part of a hose clip including the two hooked end portions 2 and 3 thereof. FIGS. 13 and 14 show the hose clips in their clamped position. It should be understood that the hooked end portions effectively terminate at their tips, 23 and 24 respectively and that the rolled back portions of wire 23 to 25 and 24 to 26 are only of incidental importance to the clamping and releasing of the hose clips.

Whilst it is intended that the hose clips of the invention will be used for clamping flexible pipes or hoses to inserts, it will be apparent that such hose clips will readily find application in numerous other fields.

What is claimed is:

1. A hose clip providing a constant locked diameter less than its characteristic unlocked diameter and comprising a coil of generally coil spring configuration and which has two mutually engageable hooked end portions each (a) being reflexed with respect to the coil; (b) projecting in mutually opposite senses and out of the plane of said coil so as to cross over at least one adjacent turn of said coil; and (c) being spaced apart from one another when the hose clip is in its relaxed condition, the hose clip having, in its relaxed condition, at least one complete turn of a first, common characteristic diameter and an incomplete turn, and being elastically deformable without plastic deformation to bring hooks defined by said hooked end portions into mutual engagement for locking said clip, the hose clip assuming in its position with said hooks engaged the configuration of a coil spring having at least two complete turns.

2. A hose clip according to claim 1, wherein the hose clip comprises, in its relaxed condition, a single complete turn and a single incomplete turn.

3. A hose clip according to claim 1, wherein said coil is wound in a clock-wise direction.

4. A hose clip according to claim 1, wherein the hose clip is constructed from steel wire of circular cross-sectional shape.

5. A hose clip according to claim 1, wherein said wire of spring steel.

6. A hose clip according to claim 1, wherein said hooked end portions comprise an arcuate portion and a substantially straight portion, said substantially straight portion having a longitudinal axis which projects generally outwardly of said coil.

7. A hose clip according to claim 1, wherein said hooked end portions each have a true length which lies within a range of from three to four W, where W is the characteristic diameter of material of which said hooked end portions are formed.

8. A hose clip according to claim 6, wherein said two hooked end portions have orientations which are such that, for each end portion, an angle in the range of from 15° to 75° is formed between the longitudinal axis of each one of said straight end portions and a plane defined by the x and y axes (FIG. 1) of the coil when said hooks are engaged.

9. A hose clip according to claim 6, wherein said two hooked end portions have orientations which are such that, for each hooked end portion, an angle in the range of from 30° to 60° is formed between the longitudinal axis of each one of said straight end portions and a line parallel to a plane defined by the x and y axes (FIG. 1) of the coil when said hooks are engaged.

10. A hose clip according to claim 6, wherein said two hooked end portions have orientations which are such that, for each hooked end portion, an angle in the range of from 15° to 75° is formed between the longitudinal axis of each one of said straight end portions and a plane defined by the x and z axes (FIG. 1) of the coil when said hooks are engaged.

11. A hose clip according to claim 6, wherein said two hooked end portions have orientations which are such that an angle in the range of from 70° to 110° is formed between the longitudinal axes of said straight end portions projected into a plane defined by the y and z axes (FIG. 1) of the coil when said hooks are engaged.

* * * * *